United States Patent [19]

Matsui et al.

[11] Patent Number: 4,774,141
[45] Date of Patent: Sep. 27, 1988

[54] POLARIZING FILM-INTEGRATED TRANSPARENT ELECTRICALLY CONDUCTIVE FILM

[75] Inventors: Ichiro Matsui, Kyoto; Tadashi Matsuo, Konosu; Shoichi Kaneko, Yono, all of Japan

[73] Assignee: Sumitomo Bakelite Company Limited, Tokyo, Japan

[21] Appl. No.: 32,754

[22] PCT Filed: Jun. 18, 1986

[86] PCT No.: PCT/JP86/00308
§ 371 Date: Feb. 12, 1987
§ 102(e) Date: Feb. 12, 1987

[87] PCT Pub. No.: WO86/07639
PCT Pub. Date: Dec. 31, 1986

[30] Foreign Application Priority Data

Jun. 19, 1985 [JP] Japan .................. 60-131634

[51] Int. Cl.[4] .................. B32B 27/38; G02B 5/30; D06P 7/00
[52] U.S. Cl. .................. 428/414; 428/1; 428/419; 428/424.6; 428/688; 428/522; 428/704; 428/523; 428/913; 427/124; 427/162; 8/489; 8/687
[58] Field of Search .................. 428/414, 419, 424.6, 428/688, 523

[56] References Cited

U.S. PATENT DOCUMENTS 4,387,133 6/1983 Khikawa et al. ............ 428/704 X
4,388,375 6/1983 Hopper et al. .............. 428/522 X
4,427,741 1/1984 Aizawa et al. .............. 428/704 X Primary Examiner—P. C. Ives
Attorney, Agent, or Firm—Browdy and Neimark

[57] ABSTRACT

A polarizing film-integrated transparent electrically conductive film, wherein a polysulfone film as a support layer is laminated on at least one surface of a polyvinyl-alcohol polarizing film which has been dyed with a water-soluble disazo compound as a free acid represented by the general formula (1)

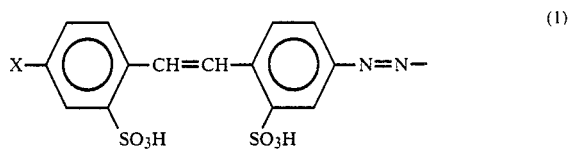

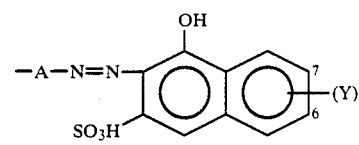

wherein X represents nitro group or amino group, A represents the formula (a) or (b)

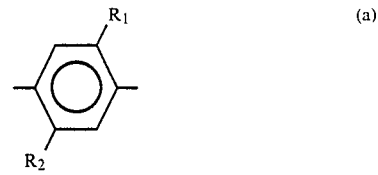

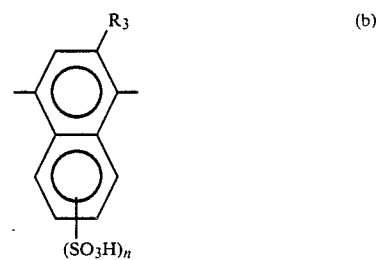

(wherein $R_1$ represents hydrogen atom, methoxy group, ethoxy group, methyl group or hydroxyl group, $R_2$ represents hydrogen atom, methyl group, methoxy group, ethoxy group, acetylamino group or ureido group, $R_3$ represents hydrogen atom, methoxy group or ethoxy group, and n is 0 or 1), and Y represents amino group, methylamino group, acetylamino group, N-methyl-N-acetylamino group, β-hydroxyethylamino group, or a phenylamino or benzoyl amino group in which the phenyl nucleus may be substituted by one or two of nitro group, amino group, hydroxyl group, methyl group, sulfonic acid group and carboxyl group, or a copper complex compound thereof and furthermore a transparent electrically conductive film is laminated on either one of the surfaces of the laminated film.

5 Claims, No Drawings

POLARIZING FILM-INTEGRATED TRANSPARENT ELECTRICALLY CONDUCTIVE FILM

TECHNICAL FIELD

This invention relates to a polarizing film-integrated transparent electrically conductive film. Particularly, this invention relates to a polarizing film-integrated transparent electrically conductive film wherein a polysulfone film as a support layer is laminated on a polyvinylalcohol polarizing film which has been dyed with a disazo compound and furthermore a transparent electrically conductive film is laminated on the laminated film.

TECHNICAL BACKGROUND

For the purpose of simplifying a process for preparing TN-type liquid crystal display elements and reducing its cost, there has previously used an organic polymer film as a support layer for a polarizing film and to provided its surface with a transparent electrically conductive film so that the polarizing film and the transparent electrically conductive film may be integrated. As a support layer for a polarizing film, there has hitherto been used an acetate film, for example, a triacetate cellulose film (TAC film). However, in the production of an integral type, the TAC film has the defects that it cannot resist the conditions in sputtering or vacuum deposition for forming a transparent electrically conductive film of high quality and the conditions in assembling liquid crystal display elements because it is inferior in heat resistance. It is not desirable either from the aspect as a support layer for a polarizing film that the film has low heat resistance.

Films including polyester, which have hitherto been studied as transparent electrically conductive films, are subjected to orientation by stretching in order to exhibit their high molecular characteristics and thus have optical anisotropy. The optical anisotropy is a fatal defect for TN-type liquid crystal display elements which employ the polarization of light.

As a polarizing element which is incorporated in a polarizing film, iodine has hitherto been used and organic dyes have recently been investigated also organic dyes. However, iodine has a large sublimability and thus is insufficient in its heat resistance when it is incorporated in a polarizing film as a polarizing element. As regards the organic dyes, the conventional ones were considerably inferior to iodine in polarizing property.

For the purpose of achieving the simplification and cost reduction in the production process of a TN-type liquid crystal display element by making an integral type of a polarizing film and a transparent electrically conductive film which have been difficult to achieve, there has been a requirement for the development of a polarizing element having a satisfactory heat resistance and a polarizing property comparable to that of iodine, the development of a resin capable of forming the integral structure with a polarizing film containing the polarizing element therein, and the like.

DISCLOSURE OF THE INVENTION

The present inventors have earnestly conducted researches for solving the above-mentioned problems. As a result, they have attained the present invention. That is to say, this invention provides a polarizing film-integrated transparent electrically conductive film, wherein a polysulfone film as a support layer is laminated on at least one surface of a polyvinylalcohol polarizing film which has been dyed with a water-soluble disazo compound as a free acid represented by the general formula (1)

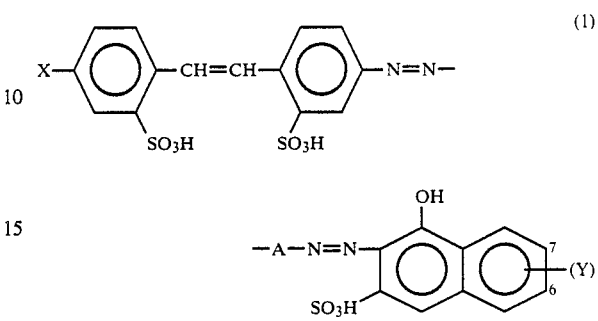

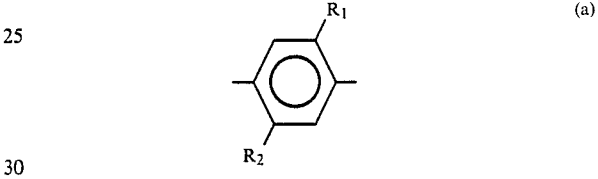

wherein X represents nitro group or amino group, A represents the formula (a) or (b)

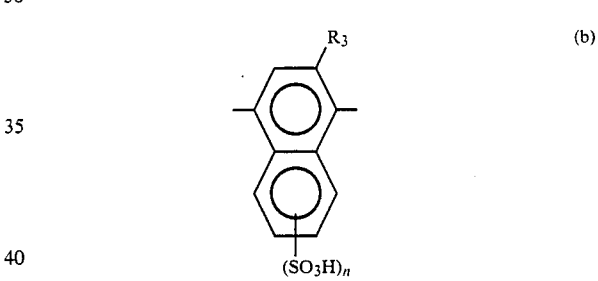

(wherein $R_1$ represents hydrogen atom, methoxy group, ethoxy group, methyl group or hydroxyl group, $R_2$ represents hydrogen atom, methyl group, methoxy group, ethoxy group, acetylamino group or ureido group, $R_3$ represents hydrogen atom, methoxy group or ethoxy group, and n is 0 or 1), Y represents amino group, methylamino group, acetylamino group, N-methyl-N-acetylamino group, a β-hydroxyethylamino group, or a phenylamino or benzoylamino group in which the phenyl nucleus may be substituted by one or two of nitro group, amino group, hydroxyl group, methyl group, sulfonic acid group and carboxyl group, or a copper complex compound thereof, and furthermore a transparent electrically conductive film is laminated on either one of the surfaces of the laminated film.

BEST EMBODIMENTS FOR WORKING THE INVENTION

The disazo compound which is used as a polarizing element in this invention and represented by the general formula (1), is prepared by the following method: A compound as a free acid represented by the general formula (2)

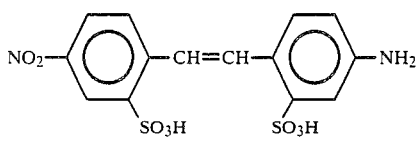 (2)

is diazotized in the usual manner and coupled with a compound represented by the general formula (3)

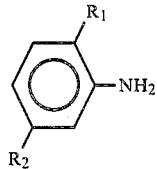 (3)

wherein $R_1$ and $R_2$ have the same meanings as defined above, or with a compound as a free acid represented by the general formula (4)

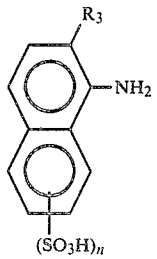 (4)

wherein $R_3$ and n have the same meanings as defined above, to produce a monoazo compound as a free acid represented by the general formula (5)

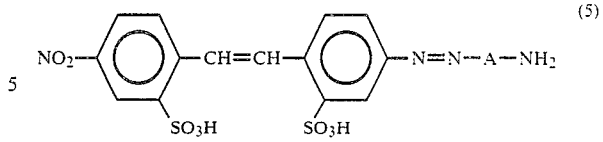 (5)

wherein A has the same meaning as defined above, and this compound is further diazotized and coupled in the usual manner with a compound as a free acid represented by the formula (6)

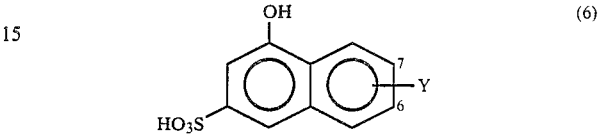 (6)

wherein Y has the same meaning as defined above and is positioned at 6- or 7-position, to produce a water-soluble disazo compound as a free acid represented by the formula (7)

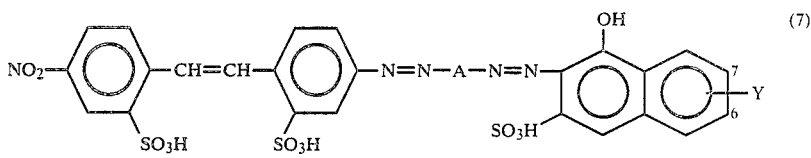 (7)

wherein A and Y have the same meanings as defined above and Y is bonded to 6- or 7-position. The compound represented by the formula (7) may be further treated with copper sulfate or the like to produce a copper complex thereof. Moreover, the compound represented by the formula (7) may be reduced with sodium sulfate or the like to produce a compound as a free acid represented by the formula (8)

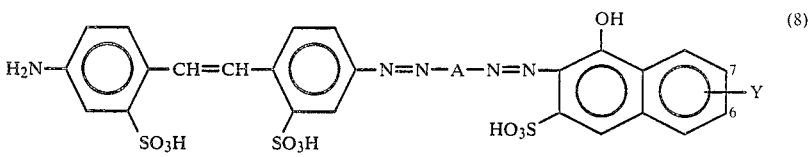 (8)

wherein A and Y have the same meanings as defined above and Y is bonded to 6- or 7-position, and if necessary, it is treated with copper sulfate or the like to produce a copper complex of the compound represented by the formula (8).

The compound represented by the general formula (1) is usually prepared as a sodium salt thereof. The compound can also be prepared as a free acid or as other salts thereof such as potassium salt, lithium salt, ammonium salt, alkylamine salt, ethanolamine salt and the like.

As the specific examples of the disazo compound represented by the formula (1), there are enumerated the following compounds:

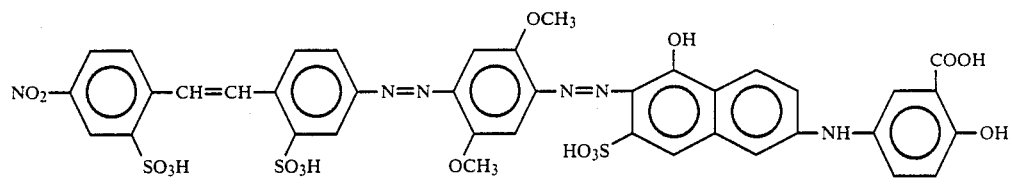
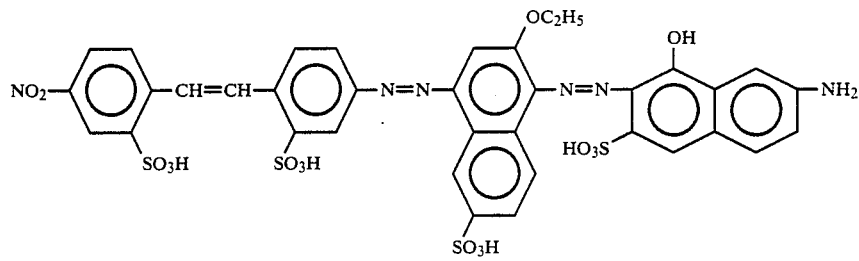
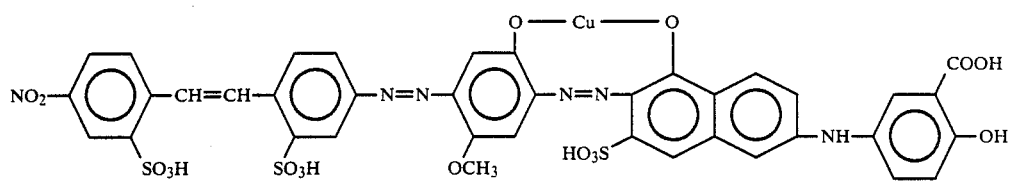
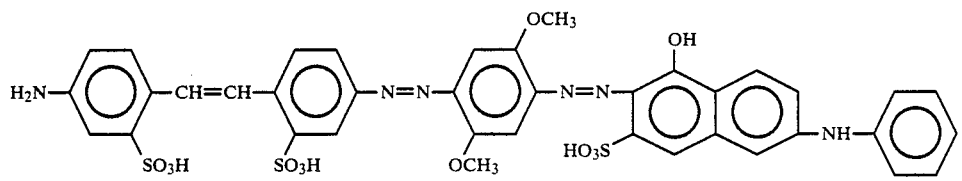
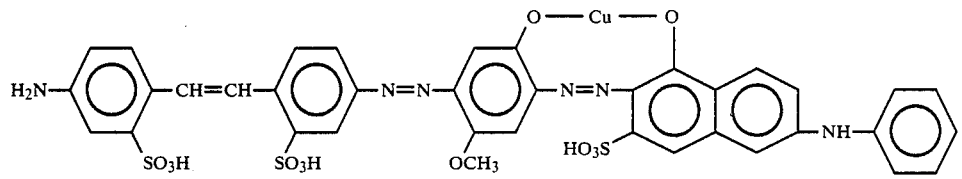
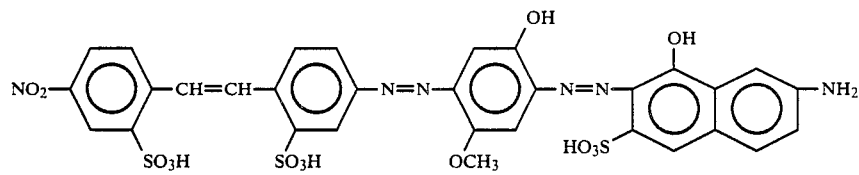
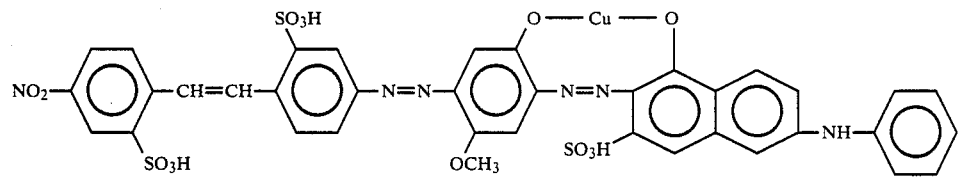
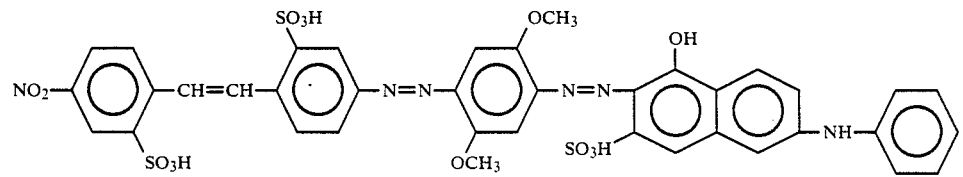

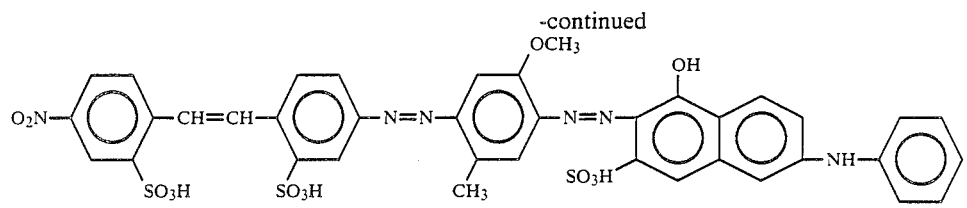

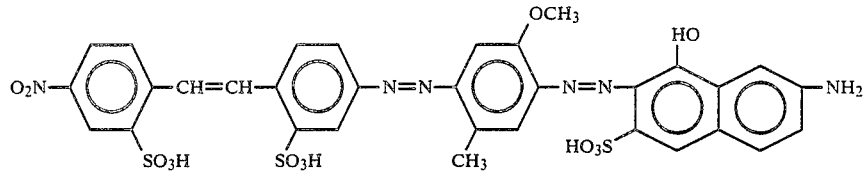

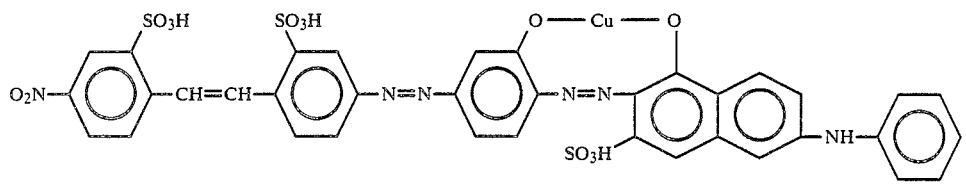

Furthermore, the disazo compounds shown in the following table are also used. The symbol X, A and Y in the table have the same meanings as those for the symbols in the formula (1).

| X | A | Y | Formation of copper complex |
|---|---|---|---|
| NO$_2$— | OCH$_3$, CH$_3$ (trisubstituted phenyl) | 6,—NH$_2$ | no |
| NO$_2$— | OCH$_3$, CH$_3$ | 6,—NH$_2$ | yes |
| NO$_2$— | OCH$_3$, CH$_3$ | 7,—NH—C$_6$H$_4$—COOH | no |
| NO$_2$— | OCH$_3$, CH$_3$ | 7,—NHC$_2$H$_4$OH | no |
| NO$_2$— | OCH$_3$, CH$_3$ | 6,—NH—C$_6$H$_4$—COOH | no |
| NO$_2$— | OCH$_3$, OCH$_3$ | 6,—NH—C$_6$H$_4$—COOH | no |
| NO$_2$— | OCH$_3$, CH$_3$ | 7,—NH—C$_6$H$_4$—SO$_3$H | no |
| NO$_2$— | CH$_3$, CH$_3$ | 7,—NH—C$_6$H$_4$—SO$_3$H | no |
| NO$_2$— | OCH$_3$, CH$_3$ | 7,—NHCH$_3$ | no |
| NO$_2$— | OCH$_3$, OCH$_3$ | 7,—NH—C$_6$H$_4$—COOH | no |
| NO$_2$— | OCH$_3$, OCH$_3$ | 6,—NH—C$_6$H$_4$—SO$_3$H | yes |

-continued

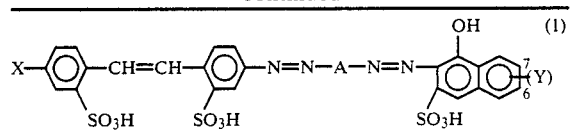

| X | A | Y | Formation of copper complex |
|---|---|---|---|
| NO$_2$— | 2-OCH$_3$, 4-CH$_3$-phenyl | 6,—N(CH$_3$)$_2$ | yes |
| NO$_2$— | 2,5-(OC$_2$H$_5$)$_2$-phenyl | 6,—NH-phenyl | no |
| NO$_2$— | 3-OCH$_3$, 4-NHCOCH$_3$-phenyl | 7,—NH$_2$ | no |
| NO$_2$— | 3-OCH$_3$, 4-NHCOCH$_3$-phenyl | 6,—NH$_2$ | no |
| NO$_2$— | 3-OCH$_3$, 4-NHCOCH$_3$-phenyl | 6,—NH-phenyl | no |
| NO$_2$— | OC$_2$H$_5$, SO$_3$H-naphthyl | 6,—NH-phenyl | no |
| —NO$_2$ | 2,4-(CH$_3$)$_2$-phenyl | 6,—NHCO-phenyl | no |
| —NO$_2$ | 4-NHCONH$_2$-phenyl | 6,—NHCO-C$_6$H$_4$—NH$_2$ | no |
| —NO$_2$ | SO$_3$H-naphthyl | 6,—NHCO-C$_6$H$_4$—NH$_2$ | no |
| —NO$_2$ | naphthyl | 6,—NHCO-C$_6$H$_4$—NH$_2$ | no |

-continued

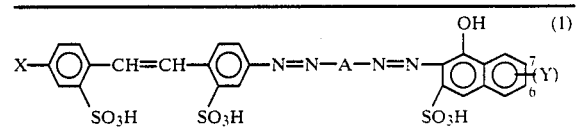

| X | A | Y | Formation of copper complex |
|---|---|---|---|
| —NO$_2$ | phenyl | 7,—NH$_2$ | no |
| —NO$_2$ | 2-OCH$_3$, 4-NHCONH$_2$-phenyl | 6,—NH-phenyl | no |
| —NH$_2$ | 2,5-(OCH$_3$)$_2$-phenyl | 7,—NH$_2$ | no |
| —NH$_2$ | 2-OCH$_3$, 4-CH$_3$-phenyl | 7,—NH$_2$ | no |
| —NH$_2$ | 2-OCH$_3$, 4-CH$_3$-phenyl | 6,—NH-phenyl | no |
| —NH$_2$ | OC$_2$H$_5$, SO$_3$H-naphthyl | 7,—NH$_2$ | no |
| —NH$_2$ | OC$_2$H$_5$, SO$_3$H-naphthyl | 6,—NH-phenyl | no |
| —NH$_2$ | 2,5-(OCH$_3$)$_2$-phenyl | 6,—NH-C$_6$H$_3$(OH)(COOH) | no |
| —NH$_2$ | 2,5-(OCH$_3$)$_2$-phenyl | 6,—NH-C$_6$H$_4$—CH$_3$ | no |
| —NH$_2$ | 2,5-(OC$_2$H$_5$)$_2$-phenyl | 6,—NH-C$_6$H$_4$—COOH | no |

-continued

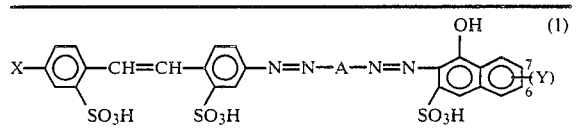

| X | A | Y | Formation of copper complex |
|---|---|---|---|
| —NH$_2$ | phenyl | 6,—NH—C$_6$H$_4$—NH$_2$ | no |
| —NH$_2$ | phenyl with OCH$_3$ and NHCOCH$_3$ | 6,—NH—C$_6$H$_4$—CH$_3$ | no |
| —NH$_2$ | phenyl with CH$_3$ | 6,—NHCOCH$_3$ | no |
| —NH$_2$ | phenyl | 7,—NH$_2$ | no |
| —NH$_2$ | phenyl with two OCH$_3$ | 7,—NH$_2$ | yes |
| —NH$_2$ | phenyl with OCH$_3$ and CH$_3$ | 7,—NH$_2$ | yes |
| —NH$_2$ | phenyl with OCH$_3$ and NHCONH$_2$ | 6,—NH—C$_6$H$_5$ | yes |
| —NH$_2$ | phenyl with OCH$_3$ and NHCOCH$_3$ | 6,—NH—C$_6$H$_4$—CH$_3$ | yes |
| —NH$_2$ | phenyl with two OCH$_3$ | 6,—NHC$_2$H$_4$OH | yes |
| —NH$_2$ | phenyl with OCH$_3$ and CH$_3$ | 6,—NH—C$_6$H$_5$ | yes |
| —NH$_2$ | phenyl with two OCH$_3$ | 6,—NH—C$_6$H$_3$(OH)(COOH) | yes |

-continued

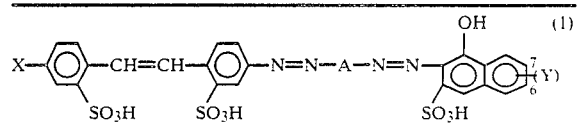

| X | A | Y | Formation of copper complex |
|---|---|---|---|
| —NH$_2$ | phenyl with two OCH$_3$ | 6,—NH—C$_6$H$_4$—CH$_3$ | yes |
| —NH$_2$ | phenyl with two OCH$_3$ | 6,—NH—C$_6$H$_4$—COOH | yes |
| —NH$_2$ | phenyl with two OCH$_3$ | 6,—NH—C$_6$H$_4$—SO$_3$H | yes |
| —NH$_2$ | naphthyl with OCH$_3$ and SO$_3$H | 6,—NH—C$_6$H$_5$ | yes |

These compounds can be employed alone or as a mixture thereof or as a mixture with other compounds (dyes).

As materials for preparing a polarizing film, there are cited, in addition to the conventional PVA, modified polyvinyl alcohols which have been modified in the range of about 15 molar % or less by copolymerization with unsaturated carboxylic acids or derivatives thereof, unsaturated sulfonic acids or derivatives thereof, an α-olefin having 2–30 carbon atoms, or the like, polyvinylacetals such as polyvinylformal, polyvinylacetoacetal, polyvinylbutyral and the like, saponification products of ethylenevinyl acetate copolymers having an ethylene content of 15–55 molar % (PVA type resins), and the like. These materials are used in the form of a film (PVA type film) for producing polarizing films. As a production process of dyed PVA type films, there can be cited the method of dyeing a molded film per se, the method of adding a dye to a solution of a PVA type resin and then forming a film from the dyed solution, and the like. First of all, the general dyeing method and stretching method of PVA type films are now explained below.

In a dyeing bath containing a disazo compound represented by the formula (1) or a copper complex salt thereof and if necessary dyeing aids such as an inorganic salt, a surface active agent and the like is dripped a PVA type film at a temperature of 0° C.–70° C., preferably 30°–45° C. to dye it. Then, if necessary, the PVA type film is subjected to boric acid treatment and dried. In order to afford polarizing function, the film is stretched uniaxially up to a length of 2 or more times of its original length, particularly preferably to a length of 2.5–4 times before dyeing, after dyeing or during dyeing. When stretching is conducted before dyeing or after dyeing, it may be conducted under dry conditions (generally in a range of ambient temperature to 180° C.) or wet conditions. When stretching is carried out during dyeing, the film is stretched in a dyeing bath at 0°–70° C., preferably at 30°–45° C. The method of forming a film after dyeing comprises first dissolving a PVA type material (resin) into a solvent such as water, an organic solvent, a water-alcohol mixed solvent or the like and adding thereto a compound of the formula (1) or a copper complex salt thereof to dye the solution. The dyed solution is subjected to film formation by casting method, solution coating method, extrusion method or the like to produce a dyed film. In order to afford polarizing function, the dyed film thus obtained is uniaxially stretched under the same wet or dry conditions as mentioned above.

The term uniaxial stretching herein means not only the stretching of a film in a solely uniaxial direction (free width uniaxial stretching), but also the stretching including a secondary stretching to a certain extent in a direction perpendicular to the primary stretching direction in order to prevent the shrinkage in the width direction (constant width uniaxial stretching).

As a support layer for the polarizing film, there is preferably used a polymer film which is good in transparency, optically isotropic and excellent in heat resistance, more particularly a polymer film which has a birefringence within 40 degrees by phase difference, a light elasticity modulus of 2.0 mm/kg or less and a heat shrinkage factor of 5% or less at 200° C. Specifically, there are used polysulfone type films such as polysulfone, polyether sulfone, polyarylsulfone and the like. Particularly preferred is a polyether sulfone (hereinafter referred to as PES) film excellent in its properties. The polysulfone type films have transparency, mechanical strength, etching resistance and solvent resistance required for a transparent electrode for TN-type liquid crystal displaying elements and thus are extremely convenient. In order to laminate the polysulfone type films on a PVA type polarizing film to get a sufficient adhesive strength, it is preferable to use an adhesive which is selected from urethane resins, epoxy resins, silicone resins and synthetic rubbers and which has a heat resistance of 2 hours or more at a temperature of at least 120° C.

The problems to be solved by the present invention have already been mentioned above and include the development of a polarizing element which has a satisfactory heat resistance and a polarizing function comparable to that of iodine and the development of a resin which is capable of forming the integral structure with a polarizing film containing the polarizing element. However, for solving such problems, it is not sufficient to laminate the PVA type polarizing film and the polysulfone type film which have been reached by this invention, merely by use of an adhesive. Thus, the present inventors have conducted researches as mentioned below. As a result, they have found a means for solving the problems.

That is to say, in discussing adhesion it is first of all important whether the surfaces to be bonded are hydrophilic or hydrophobic. When A and B are to be bonded, if both of the surfaces of A and B are hydrophilic or hydrophobic, a satisfactory bonding strength can be relatively easily obtained by selecting an adhesive of the same quality as that of the two surfaces.

However, the PVA type films are essentially hydrophilic, while the PES films are hydrophobic. Therefore, in accomplishing the present invention research has been required for increasing the bonding strength between these two films which are different from each other in their properties. Moreover, the transparent electrically conductive films to be obtained by this invention have been required as a base plate for liquid crystal displaying elements to maintain their qualities in various atmospheric changes, in particular the durability at a high temperature and a high humidity. Thus, it has been necessary to bond with a satisfactory bonding strength a hydrophilic PVA type film and a hydrophobic PES film and to maintain the bonding strength under the conditions of high temperature and high humidity.

The present inventors have conducted research on this point. As a result, they have found that a laminated product which has good productivity and satisfactory bonding strength can be obtained by making the surface of a PVA type polarizing film as hydrophobic as possible and using, as an adhesive which adheres to both of a hydrophilic surface and a hydrophobic surface with a good balance and which is low in water absorbency and thus excellent in humidity resistance, a UV-curing resin comprising particularly (i) a urethane acrylate obtained from a diisocyanate which will not turn to yellow, (ii) an epoxy acrylate, (iii) a (meth)acrylate, and as a light polymerization initiator (iv) one or more of 2-methyl-1-(4-alkylthiophenyl)-2-morpholinopropan-1-ones and (v) one or more of 1-(4-alkylphenyl)-2-hydroxy-2-methylpropan-1-ones.

Next, it was necessary to solve another problem for laminating a PVA type polarizing film and a PES film. That is, the polarizing film caused crackings or the laminated product thereof with the PES film produced a warp.

The PVA type polarizing films are stretched axially and thus cause large shrinking by the application of heat. Such a change in their sizes due to heat is a problem which tends to occur also in a PVA type polarizing film, the both surfaces of which are coated with PES films. Thus, there happened such problems that the polarizing film caused cracking or the laminated product showed a warp and thus could not be used as a base for a liquid crystal displaying element.

Regarding these problems, a PES film has an advantage that its shrinkage factor of linear expansion coefficient due to heat is scarcely different in the axial direction (MD) and the rectangular direction (TD) and that the absolute value thereof is also very small, which advantage was very important for achieving successfully this invention as well as the optical properties due to its amorphous state. It has also been found that when the both sides of the PVA type polarizing film are coated with PES films under a satisfactory bonding strength, the behavior of the polarizing film which exhibits anisotropy due to heat can be suppressed. Furthermore, it has been found that the bonding strength of 0.5 kg/cm or more in the peeling test at 180° is sufficient.

The polarizing film is usually laminated on its both sides with a polysulfone type film, and if desired, a polysulfone type film may be laminated on only one side of the polarizing film and a conventional support film such as a triacetate may be laminated onto the other side of the polarizing film.

As a transparent electrically conductive substance to be laminated onto the polysulfone type films which have been laminated on a polarizing film, there are selected noble metals such as gold, palladium and the like, or metal oxides such as tin oxide, indium oxide and the like. There is generally used an oxide composite so-called as ITO (indium tin oxide), which primarily comprises indium oxide and contains 5-15% by weight of tin oxide.

As a process for laminating the transparent electrically conductive layer, there can be used general film formation techniques such as vacuum deposition, sputtering method, ion-plating, plasma CVD, and the like. Sputtering is particularly preferred.

When the transparent electrically conductive layer is laminated on the surface of a polysulfone type film or a PVA type polarizing film, the bonding stability between the laminated transparent electrically conductive layer and polysulfone type film or PVA type polarizing film is increased by use of a UV-curable resin composition based on an epoxyacrylate, a urethane acrylate or the like, and in addition the surface evenness of the base material (polysulfone type film or PVA type polarizing film) is improved by the undercoating treatment.

Moreover, in order to obtain a transparent electrically conductive layer which is homogeneous and which has a low surface resistance and a high light transmittance by sputtering method or the like, a base material having a low gas yield is required. By the study on the laminated product of a polysulfone type film and a PVA type polarizing film, it has been found to be necessary to keep the gas yield to a level of $8 \times 10^{-5}$ m bar·1/sec·cm$^2$ or less on the measurement after one hour evacuation. As a method for lowering the gas yield to such an extent, there are cited (i) the method wherein the lamination of a polysulfone type film and a PVA polarizing film is carried out in an atmosphere which has been maintained at a low humidity, (ii) the method wherein both surfaces of the base material are coated with a low moisture permeable material, (iii) the method wherein the base material is dried in vacuum just before laminating a transparent electrically conductive layer, and the like.

According to this invention, if desired, after a polysulfone type film is bonded to a PVA type polarizing film, a transparent insulating layer may be provided for the purpose of preventing the transfer of steam, oxygen, ionic substances or the like before laminating a transparent electrically conductive layer thereon. As a material for the insulating layer, there are used transparent metal oxides such as $SiO_x$ (x=1-2), $TiO_2$, $ZrO_2$, $Al_2O_3$, $Ta_2O_5$, $Nb_2O_3$, $CeO_2$, $ZnO$ and the like. The thickness of a layer of these metal oxides is not specifically limited, but it is preferably in the range between 100-5,000 Å. If the thickness is less than 100 Å, a continuous film is scarcely formed, and the prevention against permeation of steam and oxygen and the effect of the prevention against the transfer of an ionic substance are insufficient. If it is more than 5,000 Å, the metal oxide layer would sometimes be cracked, which is not preferable. As a method for laminating the insulating layer, there can be used conventional film formation techniques such as vacuum deposition, sputtering, ion-plating method, plasma CVD, and the like. Above all the RF magnetron sputtering is preferred.

When a polysulfone type film is laminated as a support on at least one face, preferably both faces of a polarizing film, there may be provided, on the polysulfone type film at the opposite side of a transparent electrically conductive substance layer, a protective layer comprising a metal oxide or metal fluoride such as $SiO_x$ (x=1-2), $Sb_2O_3$, $CeF_3$, $ThO_2$, $CeO$ or the like for the purpose of protecting the polarizing element and the polysulfone type film (support) from sunlight, particularly from ultraviolet light. In particular, $SiO_x$ (x=1-2), $Sb_2O_3$ and $CeF_3$ are effective for cutting the sunlight of 200-300 nm which causes yellowing of the polysulfone type film. These metal protective layers are laminated in the same manner as the laminating process of the transparent electrically conductive substance layer and the insulating layer.

Moreover, when a PES film is laminated as a support on at least one side of a polarizing film, preferably on both sides thereof, the PES film at the opposite side to a transparent electrically conductive substance layer can be coated with a coating agent wherein a UV absorber has been added, for the purpose of protecting the PES film and the like from UV light. In this case, if a coating agent having a lower refractive index than that of the PES is used, the reflection of light on the film surface can be decreased to improve the light transmittance of the PES film, and furthermore an external surface which is scarcely scratched, can be obtained by using a coating agent having a high surface hardness. As such a coating agent, there is preferably used, e.g., a silicone hard coating agent wherein a UV absorber has been added.

As mentioned above, this invention has been achieved for obtaining a polarizing film-integrated transparent electrically conductive film by researching a method which exhibits to maximum extent the characteristics of both a PVA type polarizing film which is excellent in heat resistance and which uses as a polarizing element a non-sublimating disazo compound having a polarizability comparable to that of an iodine type polarizing element, and a polysulfone type film which is excellent in heat resistance and optical properties, above all PES film. In comparison with the polarizing film-integrated transparent electrically conductive films which have been reported, the film according to this invention for the first time provides a product which can be used practically.

By using the polarizing film-integrated transparent electrically conductive film of the present invention, it has become possible to carry out a continuous reel-to-reel processing with a long film, which processing has hitherto been impossible for a transparent electrically conductive film having a glass base. Thus, the time of assembling a polarizing film during the liquid crystal display element assembling process can be completely saved, so that the production process of the TN-type liquid crystal display element can be simplified and the number of the production steps can be reduced remarkably and the cost can be reduced extensively.

This invention is now explained in detail with reference to Examples.

EXAMPLE 1

A PVA film which was formed by use of a coating apparatus equipped with a doctor coater and an air-circulating type dryer, was immersed for 3 min. in a solution of 40° C. which was obtained by dissolving in 10 l of water 10 g of a disazo compound of the formula

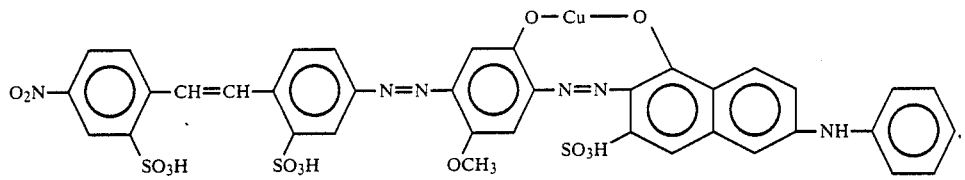

and then washed with a running water to obtain a PVA film which had been dyed blue. The dyed film was stretched in a longitudinal direction at a ratio of 3.5 with a roll type stretching machine to obtain a PVA polarizing film. To one side of the polarizing film was bonded a PES film having a thickness of 50 μm as a support layer, and to the other side was bonded a TAC film containing a UV absorber and having a thickness of 50 μm as a protective layer, with a urethane adhesive, respectively. The optical properties of the resultant polarizing film provided with a support layer and a protective layer were determined by a photospectrometer to show a transmittance of 45% and a polarization degree of 85% at $\lambda_{max}$ 605 nm.

The PES side of the above-mentioned polarizing film was subjected to undercoating treatment, and the film was then fixed by the base holder of a high frequency magnetron sputtering apparatus, and a transparent insulating layer of $SiO_2$ was formed in a thickness of 500 Å, and subsequently a transparent electrically conductive film having a thickness of 300 Å was formed in an argon plasma at $5 \times 10^{-3}$ Torr with a target comprising an indium oxide containing 7.5% by weight of tin oxide to obtain the desired polarizing film-integrated transparent electrically conductive film.

APPLICATION EXAMPLE

A TN-type liquid crystal displaying element was prepared with the polarizing film-integrated transparent electrically conductive film obtained in Example 1 by the method illustrated below. On the transparent electrically conductive surface of the film was coated a positive type photoresist by a wheeler, and after prebaking at 80° C. for 20 min. the film was exposed to UV light. Then, the film was subjected to development and to post-baking at 80° C. for 20 min., and the resist was peeled off after immersing and etching the film in a 6N HCl aq. solution.

On the electrode of the film which has been subjected to patterning, was placed a hot-melt adhesive which has been cut in the shape of a seal pattern, and on the electrode side of another film were strewed small chips of glass fiber having a diameter of 10 μm as spacers, and the two films were layered and heated to a temperature of 140° C. to melt the adhesive and form a cell.

Next, by vacuum casting method, a nematic type liquid crystal was cast from an opening which had been provided in advance, and then the opening was sealed with an adhesive.

If the film were not integrated with a polarizing film, in the subsequent step a polarizing plate would have to be bonded to the film after adjusting the axis in the polarizing direction. Since the present film is of an integral type, this step can be omitted, so that the process can be simplified and the cost can be lowered.

EXAMPLE 2

By the use of a disazo compound of the following formula,

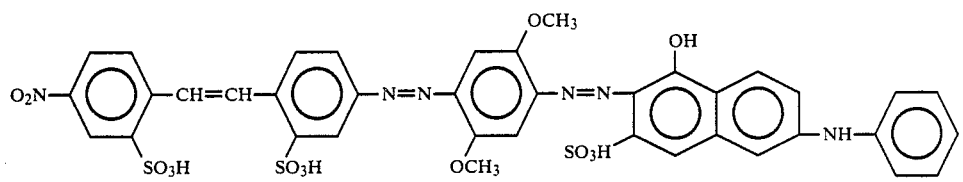

a PVA polarizing film was obtained by conducting the dyeing and stretching of the PVA film in the same manner as in Example 1. To one side of the polarizing film was bonded a PES film having a thickness of 50 μm as a support layer, and to the other side was laminated a TAC film having a thickness of 50 μm as a protective layer, with urethane adhesive, respectively. The resultant polarizing film provided with a support layer and a protective layer showed a transmittance of 44% and a polarization degree of 81% at $\lambda_{max}$ 572 nm.

The PES side of the above-mentioned polarizing film was subjected to undercoating treatment, and the film was then fixed by the base holder of a high frequency magnetron sputtering apparatus, and a transparent insulating layer of $SiO_2$ was formed in a thickness of 500 Å, and subsequently a transparent electrically conductive film having a thickness of 300 Å was formed in an argon plasma at $5 \times 10^{-3}$ Torr with a target comprising an indium oxide containing 7.5% by weight of tin oxide to obtain the desired polarizing film-integrated transparent electrically conductive film.

EXAMPLE 3

A PVA polarizing film was obtained with a disazo compound shown by the formula,

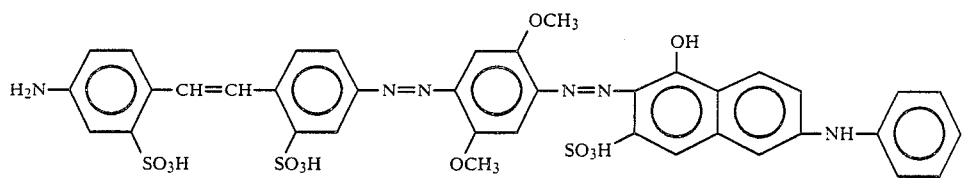

in the same manner as in Example 1 by conducting the dyeing and stretching of the PVA film.

On the other hand, a PES film having a thickness of 50 μm was obtained by extruding the PES film with a T-die extruder. This PES film was laminated as a support layer on both surfaces of the PVA polarizing film through a urethane adhesive and fixed by leaving it standing under the condition of 40° C. for 72 hours.

One PES side of the abovementioned polarizing film was coated with an undercoat, and the film was then fixed by the base holder of a high frequency magnetron sputtering apparatus, and a transparent insulating layer of $SiO_2$ was formed in a thickness of 500 Å, and subsequently a transparent electrically conductive film having a thickness of 300 Å was laminated in an argon plasma at $5\times10^{-3}$ Torr with a target comprising an indium oxide containing 7.5% by weight of tin oxide.

The other PES side was subjected to undercoating treatment, and coated with a film of $SiO_2$ as a UV-absorbing layer in a thickness of 2,000 Å by sputtering. The optical properties of the resultant polarizing film-integrated transparent electrically conductive film were determined with a photospectrometer to show a transmittance of 41% and a polarization degree of 80% at $\lambda_{max}$ 606 nm.

EXAMPLE 4

In the same manner as in Example 1, a PVA polarizing film was obtained. A light-curable resin composition was prepared in the following formulation.

| | | |
|---|---|---|
| (A) | Urethane acrylate using isophoronediisocyanate as an isocyanate component (NIPPON GOSEI KAGAKU K. K., UV-3000B) | 100 parts by weight |
| (B) | Epoxyacrylate obtained by reacting Epicoat #1004 (Tradename: epibis type epoxy resin manufactured by YUKA SHELL EPOXY K. K.) with acrylic acid | 50 parts by weight |
| (C) | 2-Hydroxypropylacrylate | 90 parts by weight |
| (D) | 2-Hydroxy-3-chloropropyl-methacrylate | 30 parts by weight |
| (E) | 2-Methyl-1-(4-methylthiophenyl)-2-morpholinopropan-1-one (Irgacure 907, manufactured by Chiba-Geigy) | 3 parts by weight |
| (F) | n-Nonylphenoxyoxyethyleneacrylate | 100 parts by weight |
| (G) | 1-(4-Isopropylphenyl)-2-hydroxy-2-methylpropan-1-one (Darocure 1116, manufactured by Merck) | 5 parts by weight |

The PVA polarizing film was inserted between 2 sheets of the PES film (70 μm thickness) the one side of which was coated with the resin composition, and air and the excessive resin composition which were present between the films were removed by pressing rolls to bond tightly the films. The laminate was immediately passed through a UV irradiating apparatus equipped with two high-pressure mercury light of 80 W/cm at a line speed of 2 m/min. The laminate was once subjected to irradiation of the UV light and then heated at 120° C. for 5 min for annealing.

The results of evaluation for the peeling strength of the polarizing plate obtained are shown in Table 1.

TABLE 1

| Test Item | Peeling Strength (kg/cm) |
|---|---|
| Normal state | >1.25 (film material was broken) |
| After heating at 140° C. for 2 hours. | >1.23 (film material was broken) |
| After wet heating at 85° C. and 85% RH for 1000 hours followed by treatment at 50° C. for 2 hours | 1.02 |

EXAMPLE 5

One side of the polarizing plate obtained in Example 4 was coated with a solution prepared in the following formulation to form an undercoat layer.

| | | |
|---|---|---|
| (A) | Urethane acrylate prepolymer comprising the reaction product of isophorone diisocyanate as an isocyanate ingredient, 1,6-hexanediol as a polyol ingredient and 2-hydroxyethyl methacrylate as an acrylic ingredient (molecular weight: ca. 3,200, m.p.: 55° C.) | 30 parts by weight |
| (B) | Epoxy acrylate prepolymer (molecular weight: ca. 1040, m.p.: 55° C., VR-90 manufactured by SHOWA KOBUNSHI K. K.) | 70 parts by weight |
| (C) | Benzyl alcohol | 300 parts by weight |
| (D) | Ethylene glycol | 200 parts by weight |
| (E) | Methyl isobutyl ketone | 150 parts by weight |
| (F) | Benzoin ethyl ether | 2 parts by weight |

The coating was conducted by using a wheeler heating at 80° C. for 10 min to remove the solvent and then irradiating UV light at a distance of 15 cm with a high-pressure mercury light of 80 W/cm for 30 seconds to cure the resin layer. The thickness of the coating film was 2.5 μm.

On the undercoat layer was formed a transparent electrically conductive film having a thickness of 300 Å in the same manner as in Example 1, and thus a polarizing film-integrated transparent electrically conductive film was formed.

Adhesion of the transparent electrically conductive film to the polarizing film was evaluated in the following manner. First of all, as the evaluation of mar resistance, several times of rubbing by use of a gauze with a load was conducted, but the change of the surface resistance was several % or less. Next, to evaluate alkali resistance, the film was immersed in 10% NaOH for 10 min., but the change of the surface resistance was little and no cracking was found.

EXAMPLE 6

The polarizing plate with an undercoat layer on one side obtained in the same manner as in Examples 4 and 5 was fixed by the base holder within the vacuum chamber of a DC magnetron sputtering apparatus, and evacuation was continued for 1 hour. The gas yield in this case was $4 \times 10^{-5}$ m bar·l/sec·cm². Then, using a target comprising indium-tin alloy, a film of indium oxide-tin oxide composite oxide (ITO) was formed with an argon-oxygen mixed gas plasma. The resulting ITO film had a thickness of 250 Å and a surface resistance of 300 $\Omega/\square$, and it was a uniform film with little unevenness.

EXAMPLE 7

The surface of the opposite side to the transparent electrically conductive film of the polarizing film-integrated transparent electrically conductive film obtained in Example 1 was coated with a Si type hard coating agent (Si COAT 801, manufactured by DAIHACHI KAGAKU KOGYOSHA) to which a UV absorber had been added, in a thickness of 10 μm. When the weather resistance test of the above-mentioned film was conducted with a FADE-O-METER, neither decrease of the transmittance nor degradation of the surface was observed even after 500 hours.

Furthermore, the single plate transmittance was increased by about 1% as compared with that of the non-coated plate. And when a liquid crystal displaying element was assembled with the film, there was obtained displaying which is light and good in contrast.

As apparent from the above-mentioned explanations, a polarizing film, a support layer and a transparent electrically conductive film were integrated to give a film for TN-type liquid crystal displaying element which is excellent in polarizing function according to this invention.

INDUSTRIAL APPLICABILITY

The polarizing film-integrated transparent electrically conductive film of the present invention in which a polarizing film, a support layer and a transparent electrically conductive film are integrated, is not only excellent in polarizing capacity but also simplifies the production process of a TN-type liquid crystal displaying element. Thus, it is very useful as a film for the TN-type liquid crystal displaying element.

We claim:

1. A polarizing film-integrated transparent electrically conductive film, wherein a polysulfone film as a support layer is laminated on at least one surface of a polyvinylalcohol polarizing film which has been dyed with a water-soluble disazo compound as a free acid represented by the general formula (1)

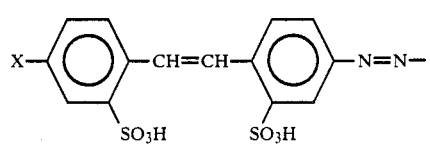

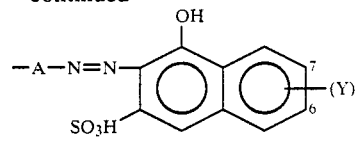

wherein X represents nitro group or amino group, A represents the formula (a) or (b)

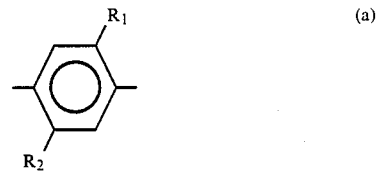

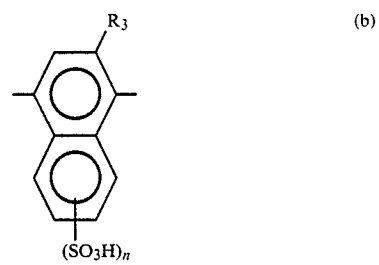

wherein $R_1$ represents hydrogen atom, methoxy group, ethoxy group, methyl group or hydroxyl group, $R_2$ represents hydrogen atom, methyl group, methoxy group, ethoxy group, acetylamino group or ureido group, $R_3$ represents hydrogen atom, methoxy group or ethoxy group, and n is 0 or 1, and Y represents amino group, methylamino group, acetylamino group, N-methyl-N-acetylamino group, β-hydroxyethylamino group, or a phenylamino or benzoylamino group in which the phenyl nucleus may be substituted by one or two of nitro group, amino group, hydroxyl group, methyl group, sulfonic acid group and carboxyl group, or a copper complex compound thereof, and furthermore a transparent electrically conductive film is laminated on either one of the surfaces of the laminated film;

wherein the lamination of said polyvinylalcohol polarizing film and said polysulfone film is effected by using as an adhesive a UV-curable resin comprising (i) a urethane acrylate obtained from a diisocyanate which will not turn to yellow, (ii) an epoxy acrylate, (iii) a (methy)-acrylate, and as a light polymerization initiator, (iv) at least one 2-methyl-1-(4-akylthiophenyl)-2-morpholinopropan-1-one and (v) at least one 1-(4-alkylphenyl)-2-hydroxy-2-methylpropan-1-one; and the lamination of said polyvinylalcohol polarizing film or said polysulfone film and a transparent electrically conductive film is effected by using as an undercoating agent a UV-curable resin composition which comprises as a base a compound selected from the group consisting of an epoxy acrylate or a urethane acrylate or a mixture thereof.

2. A polarizing film-integrated transparent electrically conductive film according to claim 1, wherein on at least one surface of said polyvinylalcohol polarizing film is laminated a polysulfone film as a support layer and furthermore on either one of the surfaces of said laminated film are laminated a transparent insulating layer and a transparent electrically conductive film.

3. A polarizing film-integrated transparent electrically conductive film according to claim 1, wherein on at least one surface of said polyvinylalcohol polarizing film is laminated a polysulfone film as a support layer and furthermore on either one of the surfaces of said laminated film are laminated a transparent insulating layer and a transparent electrically conductive film, while on the other surface is laminated a transparent metal oxide layer having a UV-absorbing effect.

4. A polarizing film integrated transparent electrically conductive film according to claim 1, wherein the laminated product of said polyvinylalcohol polarizing film and said polysulfone film has a gas yield of $8 \times 10^{-5}$ m bar·1/sec·cm² or less on determination after one hour evacuation.

5. A polarizing film-integrated transparent electrically conductive film according to claim 1, wherein on at least one surface of said polyvinylalcohol polarizing film is laminated a polysulfone film as a support layer and furthermore on either one of the surfaces of said laminated film is laminated a transparent electrically conductive film, while on the other surface is laminated a silicone coating agent which contains a UV absorber and has a lower refractive index as compared with that of the polysulfone film and a surface hardness higher than that of the polysulfone film.

* * * * *